Dec. 3, 1929.  A. J. HOWE  1,737,762
CONVEYER
Filed July 2, 1928  3 Sheets-Sheet 1
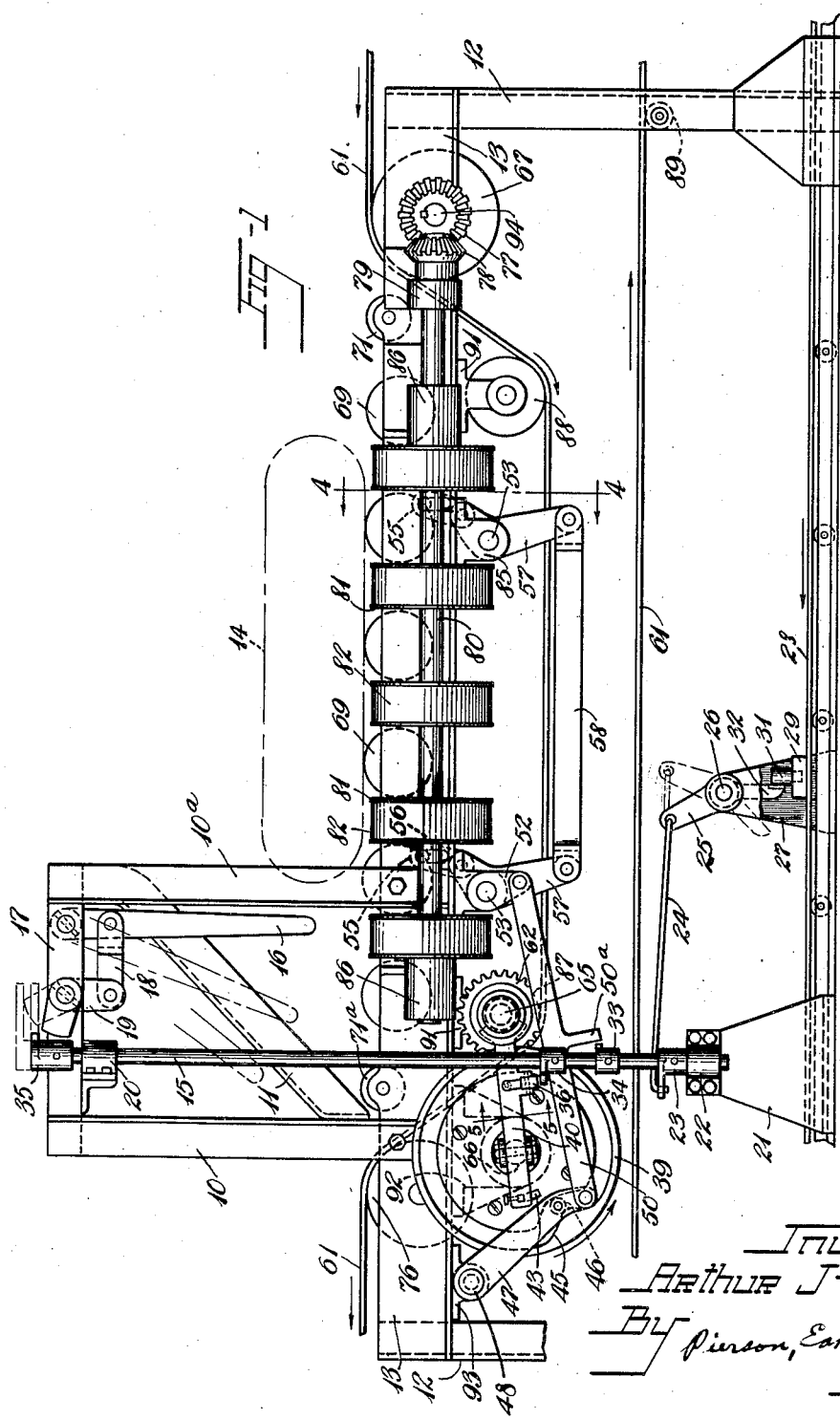

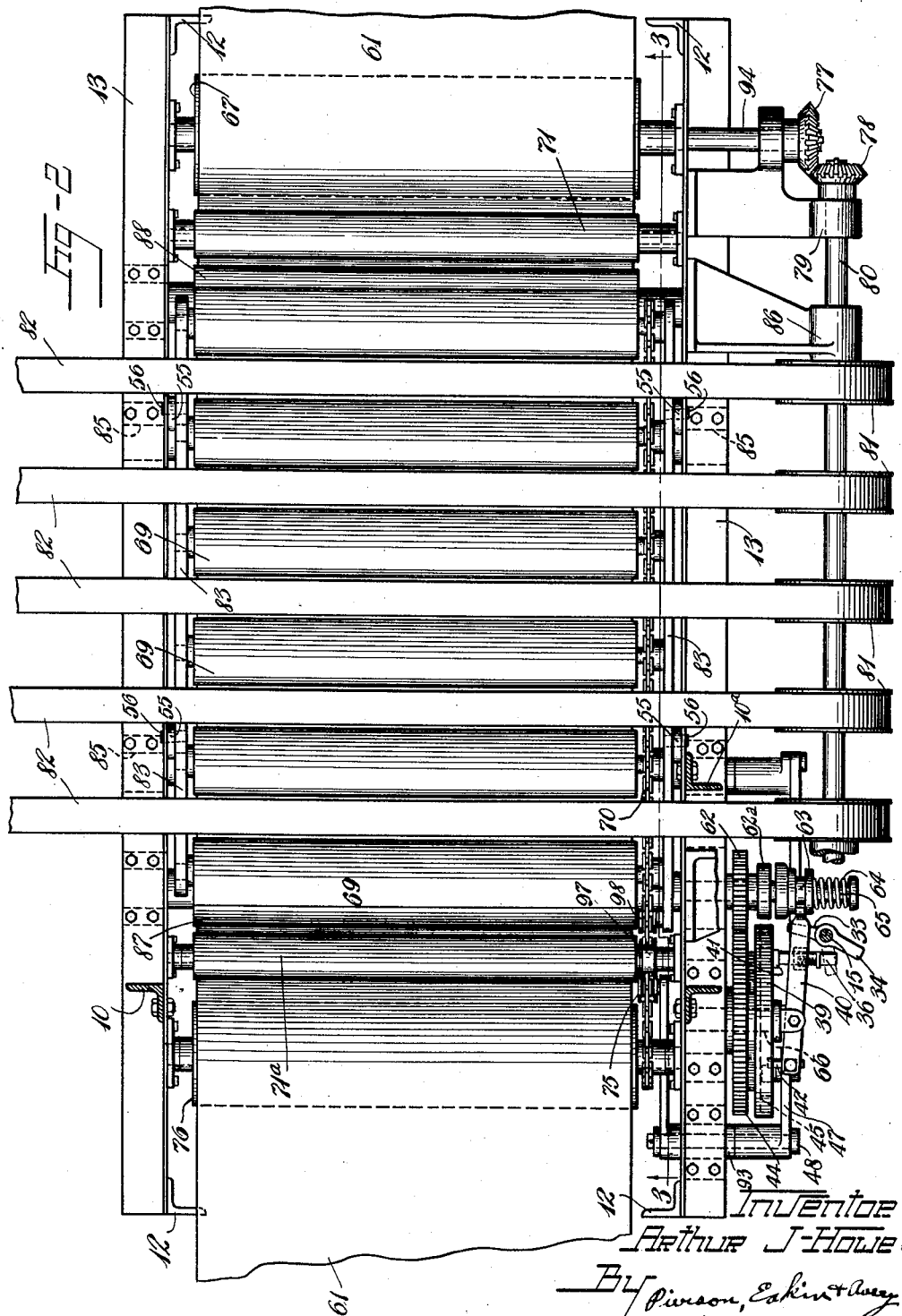

Dec. 3, 1929.   A. J. HOWE   1,737,762
CONVEYER
Filed July 2, 1928   3 Sheets-Sheet 3
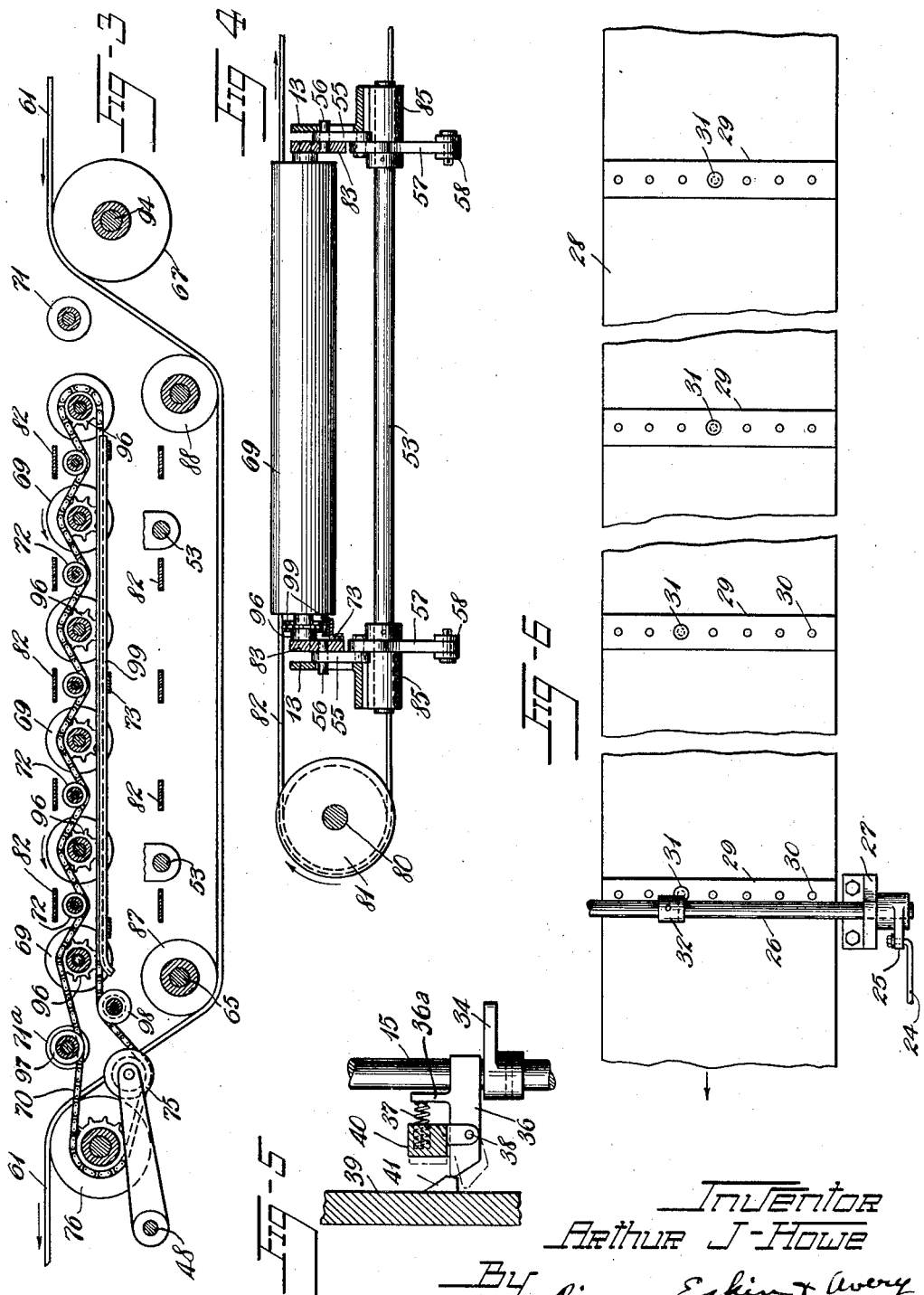

Patented Dec. 3, 1929

1,737,762

UNITED STATES PATENT OFFICE

ARTHUR J. HOWE, OF CUYAHOGA FALLS, OHIO, ASSIGNOR TO THE B. F. GOODRICH COMPANY, OF NEW YORK, N. Y., A CORPORATION OF NEW YORK

CONVEYER

Application filed July 2, 1928. Serial No. 289,746.

This invention relates to conveying apparatus and especially to branched conveyer systems wherein certain of the articles conveyed are selectively and automatically transferred from one conveyer to another for distribution of the articles to different points, as in propelling a procession of articles upon a main or trunk conveyer and diverting some of them from the trunk conveyer onto a transversely-disposed branch conveyer.

The chief objects of the present invention are to provide for accurately positioning the articles upon the conveyer to which they are transferred; to avoid dependence upon the shape or size of the article for accuracy in such positioning of it; to obviate the undesirable effects of slippage occurring between the conveyer and the article conveyed in a system wherein the particular branch conveyer onto which the article is to be transferred is predetermined by the setting of a contact member mounted upon a timing device which is mounted to move along the route of the trunk conveyer and to actuate the transferring mechanism in timed relation to the arrival of the article at the transfer point; to provide for orderly and rapid transfer of the articles; and thus to avoid bunching and jamming of the articles at the transfer point.

In the preferred embodiment of my invention which is here shown, my apparatus comprises an endless main-conveyer belt which passes to a depressed position adjacent each point selected as a station, and a vertically-movable frame carrying driven rollers positioned above said depressed portion and normally flush with the article-carrying plane of the said belt. Operatively mounted between the respective driven rollers are a plurality of relatively narrow transverse conveyer belts which are constantly driven at a greater speed than the main conveyor belt, and which have their upper or work-engaging reaches disposed slightly below the uppermost or normal position of the driven rollers. The narrow conveyer belts travel in a direction transverse to the diection of travel of the main conveyer and extend a suitable distance to the side thereof to deposit the work or article on another conveyer or in any suitable receptacle.

The arrangement is such that when a selected take-off mechanism is actuated by the article as the latter passes along the main conveyer onto the driven rollers, the said rollers are lowered in unison below the plane of the transversely-moving narrow conveyer belts, thus permitting the latter to quickly engage and remove the article laterally, after which the said rollers are automatically restored to normal position.

Referring now to the drawing forming part of this specification, Fig. 1 is a side elevation of part of a conveyer system showing a preferred embodiment of my invention.

Fig. 2 is a plan view of the same, parts thereof being shown in section.

Fig. 3 is a vertical section on the line 3—3 of Fig. 2.

Fig. 4 is a vertical transverse section on the line 4—4 of Fig. 1.

Fig. 5 shows a detail of the invention.

Fig. 6 is a plan view of portions of the pilot conveyer.

Referring to the drawings, the apparatus comprises an endless conveyer 61 suitably supported and driven. At selected points along the line of travel of the upper reach of the conveyer, article-removing stations are provided. These stations preferably comprise vertical frames or columns 12 of angle iron or the like. These columns support horizontal angle iron members 13, which in turn support vertical angle iron frame-members 10, 10$^a$. On the material off-take side of the frame, the angle iron support is bent so that its lower end rests against the lower portion of adjacent support 10, as shown at 11, to avoid interference thereof with the article being removed, and the frame-members 10, 10$^a$ and 11 support a horizontal framework 17. For depressing the main conveyer at the stations, journals 91 extend downwardly from the frame 13 and support hold-down rollers 87, 88 which are positioned substantially lower than the carrying reaches of the conveyer. Rollers 67, 76 are so journalled in frames 13 that their upper surfaces are in the plane of the conveyer between stations and are located respectively between the receiving-end of the station and roller 88; and between the discharge-end of the station and roller 87. Conveyer belt 61 extends over rollers 67 and 76 and under rollers 87, 88. Also journalled in frames 13 are idler rollers 71, 71ª which serve to support articles moving from belt 61 onto rollers 69 and, at the opposite end of the station, serve to support articles moving from rollers 69 onto belt 61. The lower reach of the conveyer is supported upon suitable rollers, such as the roller 89, mounted upon the frame 12.

The mechanism for laterally removing the articles from the main conveyer at the transfer station comprises a horizontal shaft 80 extending parallel to and supported from one of the angle iron supports 13 by journals 79, 86. This shaft is provided at one end thereof with a bevel gear 78 meshed with a bevel gear 77 on shaft 94 of the roller 67 driven by the main conveyer. At selected spaced-apart points on shaft 80, as hereafter more clearly indicated, a plurality of pulleys 81 are respectively keyed for rotation therewith, the pulleys and gearing mechanism being so selected that the upper surfaces of the former are preferably slightly below the normal plane of travel of the main conveyer between stations. The respective pulleys 81 constitute the driving end rolls for respective relatively narrow conveyer belts 82 disposed transversely of the main conveyer, between the driven conveyer rolls 69 whereby to carry articles and deposit them on another conveyer or in any suitable receptacle. These transverse conveyer belts 82 are constantly driven by means of the said gearing at a greater speed than that of the main conveyer belt.

For normally permitting the continuous passage of articles past a station in the plane of the main conveyer and above the depressed portions thereof, there are provided a plurality of spaced rollers 69 rotatably mounted in side members 83 which in turn are supported on the main frame members 13 by journals 85 for limited vertical movement, through the medium of links 55 and pins 56, the latter projecting at their outer ends through vertical slots in the frame-members 13, as shown in Fig. 4.

The respective rollers 69 are provided at one side thereof with sprockets 96 co-operating with an endless chain 70 and driven from a sprocket arranged at a corresponding side of roller 76 for simultaneously actuating the series of rollers 69 in the direction indicated in Fig. 3. A horizontal channel member 99 supported on the frame members 13 as at 73 prevents sag in the lower reach of the chain 70 during operation; and sheaves 75, 97 and 98 are provided to take up any slack in the chain during the vertical movement of the roller 69 and side members 83. By the gearing arrangement provided, the rollers 69 are driven at a rate to transport an article therealong at approximately the same speed that it travels along the main conveyer. Rollers or pulleys 72 are respectively arranged between the adjacent rollers 69 for depressing the chain 70 at these points to prevent interference thereof with the operation of transverse conveyer 82.

Sufficient space is allowed between adjacent rollers 69 to permit the passage therebetween at a point near their upper surfaces of the upper or work-carrying reaches of one of the transverse conveyer belts 82.

For selectively actuating the work-removing mechanism, a pilot conveyer 28 is arranged to move parallel with and at substantially the same speed as the main conveyer 61. In the form shown, this pilot conveyer is arranged below the main conveyer. At intervals along the upper reach of this conveyer 28 are arranged transverse strips 29 of suitable material, provided with a plurality of sockets 30 or the like for carrying freely-removable pins or studs 31. At each station there is arranged a transverse shaft 26 rotatably supported in journals 27 at each side of the conveyer 28. A collar having a depending finger 32 is mounted upon the shaft 26 in a position corresponding to its particular station. A lever arm 25 is rigidly attached to an extension of the shaft 26. The finger 32 is so positioned laterally of the conveyer 28 as to extend into the orbit of and be operated by any one of the pins 31 which may be correspondingly positioned on said conveyer as the latter moves along its path.

A vertically arranged rock-shaft 15 is supported one the base 21 in a journal 22, and passes at its upper end through a journal 20 on the frame member 17, being arranged for axial as well as angular movement therein. Mounted upon the shaft 15 are finger-bearing collars 23, 33, 34 and 35, and the finger of collar 23 is connected to the lever-arm 25 by a link 24 whereby the vertical shaft 15 is rocked by rotary movement of the shaft 26.

Depending from the frame member 17 is a pivoted arm 16 connected by link 18 to a bell crank 19, the latter being pivotally supported upon the said member 17 adjacent the shaft 15 and below the finger 35. Said arm 16 extends downwardly into the path of work moving along on rollers 69 whereby the said work moves the arm and, through the interconnected parts 18, 19, is adapted to raise the finger 35 when shaft 15 is so turned as to bring this finger directly over the upper end of the crank 19.

For raising the rollers 69 and side members 83 a lever construction is provided, which comprises a lever arm 47 journaled upon a spindle 48 which is supported upon the side frame 13 as at 93, said lever arm being pivotally connected at its opposite end to a link 50 which extends forward and is connected at its opposite end to an arm 52. The latter is mounted upon one of a plurality of transverse shafts 53, preferably at an extremity thereof. A plurality of bell cranks 57, 57 are mounted upon shafts 53, the upper arms of the cranks being connected respectively by the links 55 and link pins 56 to the side members 83. The lower arms of the adjacent cranks 57 on the same end of the shafts 53 are pivotally connected by links 58, 58 whereby when the arm 47 is moved rearwardly and downwardly the mechanism described functions to lower the side members 83 carrying the rollers 69 to a position below the level of the upper reaches of transverse conveyer belts 82.

In order to provide that the article being transported may cause a proper lowering of the rollers 69, a mechanism is provided comprising a vertically-disposed face-cam 39 journaled on a spindle 66, the latter extending laterally from a bracket 92 mounted upon the frame 13. Said cam 39 has a cam groove 45 formed in its outer face, in which a cam-roller 46, mounted on the arm 47, is adapted to travel. Secured to the rear face of the cam 39 is a gear 44, which is meshed with a gear-pinion 62 journaled on a driven shaft 65, said pinion being formed with a coaxial friction-clutch member 62ª. Pivoted on a vertical axis in the end of shaft 66 in front of the cam 39 is a clutch-actuating shipper-lever 40, which has one end forked and engaged in an annular groove in the movable member 63 of a friction-clutch mechanism, said member 63 being slidably keyed to shaft 65 of the roller 87 and urged toward operative position by a compression spring 64 mounted on said shaft. The opposite end of the shipper-lever 40 is provided with a locking stud 42 adapted normally to extend into a slot 43 formed in the front face of the cam 39 to prevent rotation of the latter.

The shipper-lever 40 has pivotally secured thereto by means of pin 38 at a point intermediate its forked end and its own pivot, a transverse latch member 36 which cooperates with a projecting cam-stud 41 on the outer face of cam 39 to force the forked end of the shipper-lever 40 outwardly against the force of spring 64 to move the clutch member 63 out of engagement with the clutch member 62ª, and at the same time to move the stud 42 into the cam slot 43. A spring 37 mounted in a recess in the lever 40 adjacent the latch member 36 bears against an upstanding finger 36ª formed on the latter to normally hold said member 36 in horizontal position and to prevent slipping of its end portion from the cam-stud 41. The position of the member 36 is directly over the finger 34 projecting from the shaft 15 when the shaft is turned angularly by the engagement of a pin 31 with the finger 32.

The link 50 is formed with a downwardly extending finger 50ª adapted to engage the finger 33 on the rock-shaft 15, during the rearward or frame-lowering movement of the link 50, to reverse the movement of said shaft and thereby restore the depending finger 32 to its normal pin-engaging position.

In the operation of the apparatus, the operator, having selected the particular station at which it is desired that the article be discharged laterally from the main conveyer, inserts a pilot pin 31 in the proper socket 30 of one of the transverse strips 29 on the pilot conveyer 28 so that the pin will trip the finger 32 at the desired station. The article, designated 14, is placed on the main conveyer at a point even with or slightly behind the vertical plane of the strip carrying the pin.

As the pin passes beneath the shaft 26 at the selected station it trips the finger 32 and through the action of members 26, 25, and 24 causes the vertical shaft 15 to turn angularly, clockwise as viewed in Fig. 2. The finger 34 moves beneath the free end of latch member 36, the finger 35 moves over and into the vertical path of the crank arm 19, and the finger 33 moves into position to be engaged by the finger 50ª of the link 50 when the latter moves rearwardly.

This prepares the mechanism for functioning upon the arrival of the article to be removed from the main conveyer.

The article passes from the main conveyer onto the rollers 69 and while traversing the same, engages and swings the lever arm 16 which functions through the lever system 18, 19 to raise finger 35 and with it the vertical shaft 15. This shaft movement raises finger 34 and lifts the free end of the latch 36, causing the opposite bevelled end thereof to move downward past the projecting cam 41. The spring 64 thereupon moves the driving clutch member 63 into driving contact with the driven clutch member 62ª, and so moves the shipper-lever 40 that the stud 42 in its rear end is withdrawn from the slot 43 in the cam-disc 39. The gear 62 is driven by the clutch member 62ª and drives the gear 44 and with it the cam-disc 39 the latter rotating in the direction of the arrow in Fig. 1. The rotation of the cam-disc 39, acting through arm 47, link 50, arm 52, shafts 53, bell cranks 57, and links 55, causes the lowering of the side members 83 carrying the rollers 69 mounted thereon to a position where the upper surfaces of the said rollers 69 are slightly below the upper reaches of the continuously-operating transverse conveyer belts 82, whereby the article is deposited upon the latter relatively fast-moving belts. The article is thereupon quickly removed from position over the rolls 69, and is delivered laterally to a predetermined place. As the article is removed laterally out of contact with lever 16, the latter drops back into place, whereupon the vertical shaft 15 is released and falls to its lowered position due to its own weight.

As cam-disc 39 begins to revolve, the arm 50 is forced rearwardly, causing depending portion 50ª to exert pressure against finger 33. This rotates shaft 15 into its original position and restores the finger 32 to pin-engaging position, and also permits latch 36 to assume a horizontal position under the force of spring 37. As the plate 39 completes one revolution the cam groove 45 cooperates with cam roller 46 to operate the mechanism so as to throw the rollers 69 upwardly to their original position above the plane of the transverse conveyer belts; and the projecting cam-stud 41 on the outer face of the cam-disc 39, in moving upward, forces the latch 36 outwardly and thus actuates the shipper-lever 40 to disengage the clutch members 62ª, 63 and hold the latter outwardly against the action of the spring 64.

Simultaneously the stud 42 of the shipper-lever 40 is forced into the slot 43 in the cam-disc 39, thus locking the latter against further rotation.

As shown in the various figures the article-transferring mechanism is in the off or non-operating position.

The employment of the transfer mechanism actuated by contact of the article only as to articles accompanied by one of the pilot pins 31 provides for transferring the articles selectively without dependence upon the size or shape of the article and provides for suitable timing of the transfer mechanism, by contact of the article, even though the article, because of slippage between it and the conveyer, may lag somewhat behind the pilot pin.

By the use of my apparatus I am able to effect the various objects of my invention already referred to and to effect a substantial economy of floor space, thereby permitting more stations to be provided along the main conveyer.

In practice the main conveyer will have a plurality of take-off stations; and means is here provided for selectively setting the mechanism of the respective stations from the point of dispatch, so that the said mechanism will be actuated by the work intended for that station, other work being permitted to continue on the main conveyer since the lever-arm 16 swings freely when the finger 35 is not above the bell crank 19.

My invention may be modified within the scope of the appended claims.

I claim:

1. Conveyer apparatus comprising a main conveyer having a take-off station, mechanical means actuated by the article being conveyed for removing the article transversely of the main conveyer at the said take-off station and separate means on a pilot conveyer for setting the said mechanical means so that it will be actuated by the article as the latter contacts therewith in its passage along the main conveyer.

2. Conveyer apparatus comprising a main conveyer having a take-off station, means at the said take-off station and actuated by the article being conveyed for changing the direction of travel of the article at the station and for moving it transversely of the direction of travel of the main conveyer, a pilot conveyer and removable means selectively held thereon for adjusting the direction-changing means so that it will be actuated by the article as the latter contacts therewith.

3. Conveyer apparatus comprising a plurality of rollers spaced apart in the same horizontal plane, the rollers being driven at the same speed and serving to support and convey an article thereupon, a plurality of conveyers respectively arranged between the adjacent rollers for movement of the article transversely of the direction of rotation of the said rollers, means for operating said conveyers, and means actuated by the article for effecting relative vertical movement of the said rollers as a unit and the said conveyers to position the rollers with their upper portions alternately below and above the plane of the upper reaches of the said conveyers.

4. Conveyer apparatus comprising a plurality of rollers spaced apart in the same horizontal plane for supporting and conveying an article, means for rotating the plurality of rollers at the same speed from a sprocketed driving member, said means including sprockets mounted on adjacent ends of each of said rollers, an endless chain driven from the sprocketed driving member and meshing respectively with each of said roller sprockets, a plurality of idler pulleys respectively located between adjacent rollers and adapted to press upon and to depress the chain between said adjacent rollers, means for vertically moving the said rollers as a unit, and chain-tightening means adapted to take up the slack in the chain during vertical movement of the rollers.

5. A conveying apparatus comprising a plurality of vertically-movable auxiliary conveying members spaced apart in the same horizontal plane adapted to convey an article therealong, means for driving the said auxiliary conveying members at a uniform speed, which means comprises sprockets respectively secured on the adjacent ends of each of said auxiliary conveying members, a sprocketed member on the main conveyer, a chain running over all of said sprockets serving to drive said auxiliary conveying members, and chain-tightening means cooperating with the chain to take up any slack therein.

6. A conveyer apparatus comprising a main conveyer having a depressed portion at a selected point thereon and having a plurality of auxiliary vertically movable conveying members spaced apart in the direction of travel of the main conveyer and arranged above the depressed portion of the main conveyer for normally transporting an article from the main conveyer at one side of the depressed portion thereof and onto the same at the other side of said depressed portion, a rotatable driven shaft supported longitudinally of and at one side of the main conveyer, and having a plurality of pulleys respectively secured thereon, the individual pulleys being respectively so positioned on the shaft that the plane of rotation of each pulley passes longitudinally through a corresponding space between two adjacent auxiliary conveying members and having their upper surfaces slightly below the normal horizontal plane of travel of the main conveyer, and separate belt means cooperating respectively with each of said pulleys and extending transversely across the path of travel of said main and auxiliary conveying members.

7. An apparatus as defined in claim 6 including a second shaft driven by the main conveyer and so geared to the first-named shaft that the said belts travel at a greater speed than the main and auxiliary conveyers.

8. In a conveyer apparatus having a plurality of vertically-movable conveying members spaced apart in the same horizontal plane and having a plurality of transverse conveyers arranged respectively between the spaced vertically-movable conveying members, means for actuating the auxiliary conveying members for vertical movement which comprises slotted main conveyer supporting-frame members, side members in which the adjacent ends of the plurality of auxiliary conveying members are mounted for rotation, transverse shafts pivotally carried by the said frame members, lever members keyed to said shaft and operatively connected to said side members, and means to rotate said shaft whereby the lever operates to lower and raise the side members and auxiliary conveying members, on the frame members.

9. A conveyor apparatus as defined in claim 8 in which the frame members have slots therein co-operating with pins in the said side members for limiting the vertical movement of the latter under the influence of power applied through the said levers.

10. Conveyer apparatus comprising a main conveyer having a take-off station, vertically-movable auxiliary conveying means at said station, an additional conveying means at said station and operatively associated with said main conveyer for transporting articles removed therefrom in a fixed relation in a transverse direction, mechanical means at the station and operated by the article being conveyed for vertically moving the said auxiliary conveying means whereby to deposit said article from the auxiliary conveyer upon said transverse conveyer when the said mechanical means is in operative position, said means being normally in inoperative position, a separate pilot conveyer, and tripping means arranged thereon for changing the said mechanical means from its inoperative to its operative position, ready for operation by the article upon its arrival at the station.

11. An apparatus for transporting an article comprising an endless main conveyer having a depressed portion, a plurality of auxiliary conveying members arranged above the depressed portion and spaced apart in the direction of travel of the main conveyer, means for driving the said auxiliary conveying members, transverse conveying members spaced apart longitudinally of the path of the main conveyer and arranged therein at the said depressed portion and adapted to support an article in fixed relation thereto while moving the latter in a direction transverse to the path of movement of the main conveyer, and mechanical means for depositing the article from the auxiliary conveyers upon the transverse conveying members without pause in the movement of the article.

12. Conveyer apparatus as defined in claim 11 in which auxiliary conveying members are arranged for limited vertical movement in and below the plane of movement of the main conveyer.

13. Conveyer apparatus as defined in claim 11 in which the said depositing means comprises lever means cooperating with an article being transported along the auxiliary conveying members for lowering the latter below the horizontal level of the upper reaches of the transverse conveyer members.

In witness whereof I have hereunto set my hand this 28th day of June, 1928.

ARTHUR J. HOWE.